United States Patent
Aikens et al.

(10) Patent No.: US 7,913,227 B2
(45) Date of Patent: Mar. 22, 2011

(54) METHODS AND APPARATUS FOR MANAGEMENT OF CONFIGURATION ITEM LIFECYCLE STATE TRANSITIONS

(75) Inventors: Glenn C. Aikens, Raleigh, NC (US); Melissa Jane Buco, Amawalk, NY (US); Maheswaran Surendra, Croton-on-Hudson, NY (US); Christopher Ward, Glen Ridge, NJ (US); Steve Weinberger, Lewis Center, OH (US); Sam Shixiong Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 11/679,999

(22) Filed: Feb. 28, 2007

(65) Prior Publication Data

US 2008/0208792 A1 Aug. 28, 2008

(51) Int. Cl.
*G06F 9/44* (2006.01)
(52) U.S. Cl. ...................................................... 717/120
(58) Field of Classification Search ........... 717/120–123
See application file for complete search history.

(56) References Cited

U.S. PATENT DOCUMENTS

2006/0004875 A1* 1/2006 Baron et al. .................. 707/200
2007/0203952 A1* 8/2007 Baron et al. .................. 707/200

OTHER PUBLICATIONS

Janel Metcalfe, "How to Select & Implement the Right CMDB", Apr. 2007, itSM Solutions®, pp. 1-7.*
Hank Marquis, "Configuration Management for the Rest of Us", Jul. 2006, itSM Solutions®, pp. 1-5.*
C. Ward et al., "Integrated Change and Configuration Management," IBM Systems Journal, Jul. 2007, pp. 459-478, vol. 46, No. 3.

* cited by examiner

*Primary Examiner* — Ted T Vo
(74) *Attorney, Agent, or Firm* — Louis Percello, Esq.; Ryan, Mason & Lewis, LLP

(57) ABSTRACT

Techniques for managing a plurality of configuration items in an information repository are provided. Lifecycle state transitions of the plurality of configuration items are regulated in accordance with one or more lifecycle state transition diagrams and, when a life cycle state transition involves a protected life cycle state, one or more request for change identifiers.

18 Claims, 4 Drawing Sheets

How RFC Is Used

| How Lifecycle Is Used | No Validation | RFC ID Validation (RFC ID not understood by ITSM) | RFC Relationship Choice Validation (requires access to RFC Proxies) | RFC Relationship Match Validation (requires interpretation of RFC Proxies) |
|---|---|---|---|---|
| None | Always update | Update if some RFC ID is provided | | Update if RFC is the RFC for this CI update |
| Protected States (e.g. production) | N/A | Update if some RFC ID is provided and CI is in or transitioning protected state | Update if CI is related to RFC and CI is in or transitioning protected state | Update if RFC is the RFC for this CI update and CI is in or transitioning protected state |
| Protected States and Attributes | N/A | Update if some RFC ID is provided and CI is in or transitioning protected state and required attributes are provided | Update if CI is related to RFC and CI is in or transitioning protected state and required attributes are provided | Update if RFC is the RFC for this CI update and CI is in or transitioning protected state and required attributes provided |
| Enforced State Transitions | N/A | Update if some RFC ID is provided and enforce a state diagram | Update if CI is related to RFC and enforce a state diagram | Update if RFC is "the" RFC for this CI update and enforce a state diagram |
| Enforced State Transitions and Attributes | N/A | Update if some RFC ID is provided and enforce a state diagram and required attributes are provided | Update if CI is related to RFC and enforce a state diagram and required attributes are provided | Update if RFC is "the" RFC for this CI update and enforce a state diagram and required attributes are provided |

FIG. 3

METHODS AND APPARATUS FOR MANAGEMENT OF CONFIGURATION ITEM LIFECYCLE STATE TRANSITIONS

CROSS REFERENCE TO RELATED APPLICATIONS

This application is related to: the U.S. patent application Ser. No. 11/679,996, entitled "Methods and Apparatus for Authentication of Configuration Items via Configuration Item Change Analysis" which is filed concurrently herewith and incorporated by reference herein.

FIELD OF THE INVENTION

The present invention relates to information technology (IT) systems and, more particularly, methods and apparatus for providing life cycle state transition management of configuration items (CIs) in a configuration management database (CMDB).

BACKGROUND OF THE INVENTION

Large and complex IT service management environments that provide multiple services to a plurality of customers can create an unmanageable number of entities. It is best practice to make use of a logically centralized repository for the storage and access of the data, commonly referred to as a CMDB. The configuration data stored in this CMDB includes a representation of managed resources; such a representation is called a CI. CMDB CIs represent an extensive range of logical and physical entities and their complex relationships. A typical implementation of a CMDB may contain more than 800 abstract object classes, with implicit and explicit relationships between them that may be extended in an open-ended fashion.

Organizing entities into dependency trees or graphs for a high-level view of the topology eases systems management. A CMDB is broad and semantically rich enough that it may apply to higher layers such as, for example, a business process or a distributed application. A CMDB is also granular enough to represent, for example, tables in a database or enterprise Java beans (EJBs) used in an enterprise application. In real-world enterprise systems, there may be tens of thousands or more entities with complex relationships between them. Compositions are ideally suited to multi-layered topologies.

The CMDB records the existence, attributes, relationships, history and status of CIs. An attribute is a descriptive characteristic of a CI such as, for example, make, model, serial number, or location. A relationship describes associations, such as, for example, the dependency and/or connectivity between CIs.

At present there is little control over the manner in which these CIs are controlled, in particular the circumstances under which they can be changed as reflected by the lifecycle state that the CI is in. Because of this, it is possible for the administrators of this managed IT environment to make changes to configuration items in the CMDB at times that such changes should not be made, resulting in CI representations that are not correct in accordance with the administrators expectations. This leads to incorrect understanding by the administrators as to the correct state of the CMDB.

SUMMARY OF THE INVENTION

In accordance with the aforementioned and other objectives, the embodiments of the present invention are directed towards methods and apparatus for CI lifecycle state transition management within a CMDB.

For example, in one aspect of the invention, techniques for managing a plurality of CIs in an information repository are provided. Lifecycle state transitions of the plurality of CIs are regulated in accordance with one or more lifecycle state transition diagrams and, when a life cycle state transition involves a protected life cycle state, one or more request for change (RFC) identifiers.

In additional embodiments of the present invention, it is determined whether at least one of a current lifecycle state and a future lifecycle state for each of the CIs is a protected life cycle state. It is determined whether an RFC identifier is provided for the given lifecycle state transition when at least one of a current lifecycle state and a future lifecycle state is a protected lifecycle state for the given CI. A given lifecycle state transition for a given CI of the plurality of CIs is permitted when a current lifecycle state and a future lifecycle state for the given CI are not protected lifecycle states or when the RFC identifier is provided for the given lifecycle state transition. The given lifecycle state transition is rejected when the RFC identifier is not provided for the given lifecycle state transition.

In a further embodiment of the present invention, with respect to permission of a lifecycle state transition, it is determined whether a future lifecycle state is a valid lifecycle state for the given CI. A lifecycle state transition is rejected when the future lifecycle state is not a valid lifecycle state for the given CI. It is determined whether a lifecycle state transition from a current lifecycle state to the future lifecycle state is valid for the given CI in accordance with a lifecycle state transition diagram, when the future lifecycle state is a valid lifecycle state for the given CI. The lifecycle state transition is rejected when the lifecycle state transition is not valid for the given CI. The given lifecycle state transition is permitted when the lifecycle state transition is valid for the given CI.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a table illustrating lifecycle state and RFC interaction, according to an embodiment of the present invention.

DETAILED DESCRIPTION OF PREFERRED EMBODIMENTS

As will be described in detail below, the embodiments of the present invention introduce techniques for managing lifecycle state transitions of CIs in a CMDB. A lifecycle is the span of time that begins when the CI is created and ends when it is no longer available for use. Managing the lifecycle state of a CI implies: 1) ensuring that a change in the lifecycle state is in accordance with a defined state transition diagram, and 2) that for CIs in selected protected states, changes to the lifecycle state are associated with an RFC. Control of the lifecycle state ensures users who work with CIs are aware of the current state of a CI when changes are made to the CI.

Figure 1:
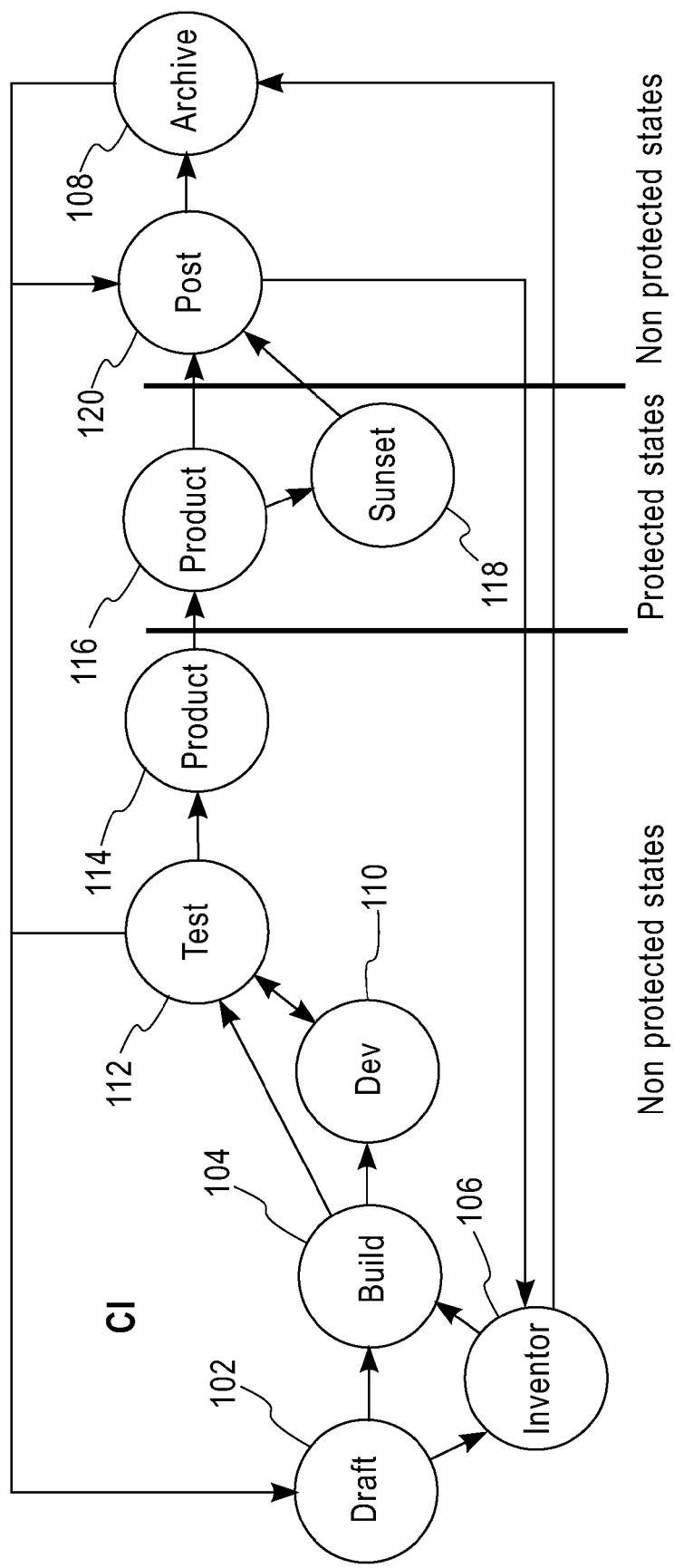
FIG. 1 shows a lifecycle state diagram illustrating available lifecycle states and transitions for a CI, according to an embodiment of the present invention.

Referring initially to FIG. 1, a lifecycle state diagram illustrates available states for a CI and permissible lifecycle state transitions, according to an embodiment of the present invention. The lifecycle state of a CI is the span of time that begins when the CI is created and ends when it is no longer available for use. The lifecycle state of a CI is stored in the CMDB as a CI attribute and may be one of the following states: unknown, other, ordered, received, in-test, tested, installed, enabled, disabled, in-maintenance, retired, archived, accepted, draft, build, validate, production-ready, sunset, postproduction, inventory, development, and offline.

In the specific embodiment of a CI lifecycle state diagram shown in FIG. 1, a draft state 102 is shown having transitions to a build state 104 and an inventory state 106. Inventory state 106 has transitions to an archive state 108 as well as build state 104. Build state 104 has transitions to a development state 110 and a tested state 112. Development state 110 also has a transition to tested state 112. Tested state 112 has a transition to a production-ready state 114 as well as draft state 102. Production-ready state 114 has a transition to a production state 116, a protected lifecycle state. Production state 116 has a transition to a sunset state 118, another protected lifecycle state. Both production state 116 and sunset state 118 have transitions to postproduction state 120. Post-production state 120 has a transition to inventory state 106 and archive state 108.

In accordance with an embodiment of the present invention, the lifecycle state attribute is read-only when viewed in the work with configuration items portlet. It can be modified in a change lifecycle state portlet or by calling a Web Services CTGPMCMControlCIState process.

A CI with its lifecycle state attribute in a protected state is considered to be under change control. A state should be designated as protected if changes to the CI would have a significant impact on the environment, with such changes accountable to an RFC. As shown the embodiment of the present invention in FIG. 1, protected lifecycle states include production state 116 and sunset state 118. Therefore, changes to the lifecycle state either to or from protected states require association with an RFC. If a CI's lifecycle state transition does not involve protected states, an RFC is not required for the transition. A lifecycle state may be set as protected by modifying the protectedLifecycleStates property in the ciLifecycleMgmt.txt file. By default, production state 116 and sunset state 118 are protected.

When a CI is transitioned into, from or between protected lifecycle states, the RFC relationship is updated to reflect this fact. For cases where the CMDB is used to store RFCproxies and maintain a refers relationships between CIs and RFCproxies, changes to the lifecycle state which involve protected states are reflected in updates to the AffectedTime property of an affects relationship. For cases where an RFC external to the CMDB is cited, such as, for example, useRFCProxiesOnly property described below, the association is recorded in an RFC_RECONCILATION table within the process database.

An example of the importance of a protected lifecycle state would be the identification of a server as a CI in a managed environment. The server CI goes through the following unprotected lifecycle states: installed, testing and production-ready, respectively. When the server is put into production, the lifecycle state needs to be changed to production state, which is a protected lifecycle state. An RFC is required to change the lifecycle state of the server CI to production state, because putting the server into production is having a significant impact on the environment.

The lifecycle state properties file ciLifecycleMgmt.txt contains the properties that used to configure the lifecycle management process. This properties file lists the possible lifecycle states, acceptable state transitions, protected states, and other settings. The following properties in this file may be used to customize the process to change the lifecycle state of CIs:

The useRFCProxiesOnly property indicates whether an open RFC that is stored in the CMDB may only be used during a transition to or from a protected lifecycle state. If useRFCProxiesOnly is set to true, a list of open RFCs in the CMDB will be displayed in the user interface and a record of the relationship that is created between the CI and the RFC during the transition to or from a protected lifecycle state and the timestamp will be recorded in the CMDB. If useRFCProxiesOnly is set to false, an RFC ID may be entered that does not have to be in the CMDB, and a table in the process database will be updated with the relationship between the CI and the RFC and the timestamp. The default setting is true validLifecycleStates. The validLifecycleStates are the operational states that are used in the lifecycle management.

The protectedLifecycleStates property specifies which states require that an RFC be associated with the lifecycle state change. If an RFC is not specified when you are transitioning a CI to or from a protected state, the lifecycle state cannot be changed.

The defaultState property is used to specify the state of a CI that does not have a lifecycle state set for it.

The allowedLifecycleStateTransition property specifies which lifecycle states transitions are allowed. A lifecycle state transition is the changing of a CI from one lifecycle state to another.

The following file is an example of a ciLifecycleMgmt.txt file.

```
######### Begin Standard Header - Do not add comments here ###############
# # File: ciLifecycleMgmt.properties, ccmdb_de
# Version: 1.0
# Modified: 05/15/06 20:46:08
# Build:
# # Licensed Materials - Property of IBM # # Restricted Materials of IBM
# # 5799-M 19
# # (C) COPYRIGHT IBM CORP. 2005. All Rights Reserved
# # US Government Users Restricted Rights - Use, duplication or # disclosure restricted by GSA
ADP Schedule Contract with IBM Corp.
#         ###########################    End    Standard    Header
##############################
```

```
### Process Solution - ConfigMgmt properties
# The following properties are used with the lifecycle management process and navigation
tasks.
# State transition diagrams are enforced as described below.
# Change control will be enforced for CIs in protected states.
# Note - The possible lifecycle states (operational states in CMDB) are
# UNKNOWN = 0;
# OTHER = 1;
# ORDERED = 2;
# RECEIVED = 3;
# IN_TEST = 4;
# TESTED = 5;
# INSTALLED = 6;
# ENABLED = 7;
# DISABLED = 8;
# IN_MAINTENANCE = 9;
# RETIRED = 10;
# ARCHIVED = 11;
#ACCEPTED = 12;
# DRAFT = 13;
# BUILD = 14;
# VALIDATE = 15;
# PRODUCTIONREADY = 16;
# PRODUCTION = 17;
# SUNSET = 18;
# POSTPRODUCTION = 19;
# INVENTORY = 20;
# DEVELOPMENT = 21;
# OFFLINE = 22;
# Note - the useRFCProxiesOnly flag indicates whether or not all RFCs will be represented by an
RFC proxy
useRFCProxiesOnly = true
#Note - valid states are those operational states used with lifecycle management valid
LifecycleStates = 11, 13, 14, 15, 16, 17, 18, 19, 20, 21
# Note - protected states are those operational states used with lifecycle management for which an
RFC is required for transition
protected LifecycleStates = 17, 18
# Note - the defaultState is the assumed state for any CI for which no other state has been set
defaultState = 13
# Note - allowed lifecycle state transitions are transitions from one lifecycle state to another
which are permitted by lifecycle state transition
allowedLifecycleStateTransitions = 11-13, 13-14, 13-20, 14-15, 14-21, 15-16, 15-9, 15-21, 16-17, 17-18,
17-19, 18-19, 19-11, 19-20, 20-11,
```

Figure 2:
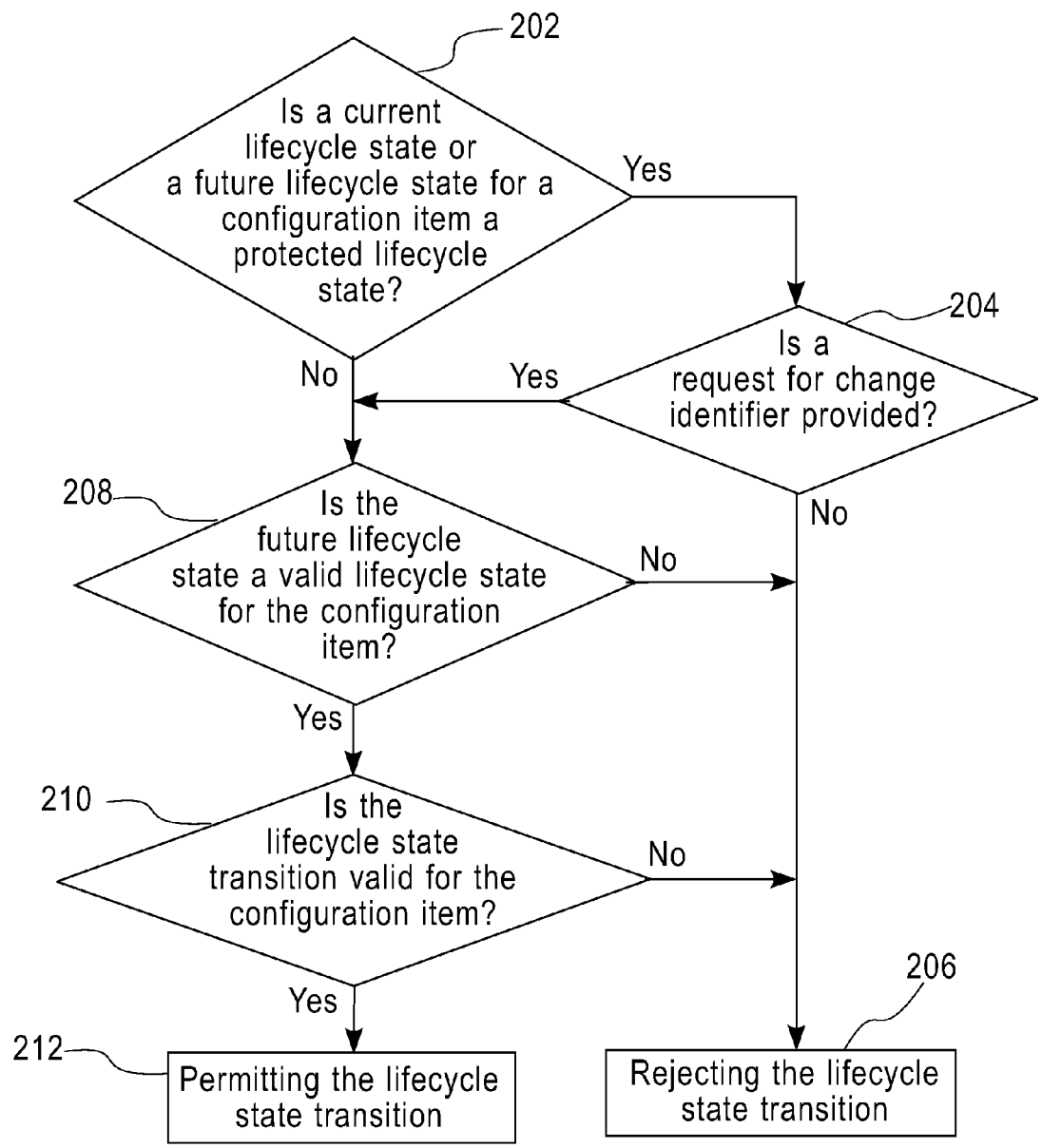
FIG. 2 shows a flow diagram illustrating a CI state transition management methodology, according to an embodiment of the present invention.

Referring now to FIG. 2, a flow diagram illustrates a lifecycle state transition management methodology, according to an embodiment of the present invention. In block 202, it is determined if a current lifecycle state or a future lifecycle state for a configuration item is a protected lifecycle state. A current lifecycle state for each CI is determined, and a list of validation requests for lifecycle state transitions is created. If either the current or future lifecycle state is a protected lifecycle state, the methodology continues at block 204, where it is determined if an RFC identifier is provided. It is also determined whether an open RFC stored in the CMDB is related to CIs that are affected by the transition defined by associations created during construction of a change record.

If an RFC identifier is not provided, the lifecycle state transition is rejected at block 206. If an RFC identifier is provided in block 204, or the current or future lifecycle state is not a protected lifecycle state in block 202, the methodology continues at block 208, where it is determined if the future lifecycle state is a valid lifecycle state for the CI. If the future lifecycle state is not valid, the lifecycle state transition is rejected in block 206. If the future lifecycle state is valid, it is determine if the lifecycle state transition is valid for the CI in block 210. If the lifecycle state transition is not valid, the lifecycle state transition is rejected in block 206. If the lifecycle state transition is valid, the lifecycle state transition is permitted in block 212.

In accordance with an embodiment of the present invention, the ControlCIState process will take as input an array of CIs (GUIDs) along with the RFC and desired state for each CI. The ControlCIState will enforce a protected state model. For each CI in the array, ControlCIState process will check if the existing state is protected. If the CI is not in a protected state, and the to-be state is not a protected state, the request may continue to the user customizable module. If the CI request is to transition to/from a protected state, the RFC will be checked to see if it is related (and current) to this CI. If the RFC is related the request may continue to the user customizable module. If the RFC is not related (or not provided) this lifecycle change request is rejected.

The ControlCIState will provide a user customization capability that could allow additional lifecycle enforcement models. The CI GUID, the current state, the future state, the lifecycle state graph, and RFC ID will be passed to a user customization module in which additional validation activities can be performed. The return code from user customization module will be used to either allow the update to take place or reject the request.

Referring now to FIG. 3, a table illustrates lifecycle state and RFC interaction, according to an embodiment of the present invention. The update referred to FIG. 3 applies to the lifecycle state attribute only, not to the other properties of the CI. An RFC may be used with no validation, as ID validation, as relationship choice validation, or as relationship match validation. Lifecycles may have protected states, protected states and attributes, enforced state transitions, and enforced state transitions and attributes. The table of FIG. 3 illustrates the relationship between these uses for lifecycle states and RFCs. More specifically, FIG. 3 illustrates the access control choices for an administrator in controlling access to attributes of a CI. Given a selection, the CI can be updated only if the conditions are satisfied. Configuration choices may vary by CI, CI type, or account, in a multi-account environment.

When RFC validation is not required, and the lifecycle state is not protected, updates are always permitted. Five choices are provided when an RFC ID validation is required. When the lifecycle state is not protected, an update may be provided if some RFC ID is provided. When there is a protected state, an update may be provided if some RFC ID is provided and the CI is in or transitioning to/from a protected state. When there are protected states and attributes, an update may be provided if some RFC ID is provided, the CI is in or transitioning to/from a protected state and required attributes are provided. When there are enforced state transitions, an update may be provided if some RFC ID is provided and a state diagram is enforced. When there are enforced state transitions and attributes, an update may be provided if some RFC ID is provided, a state diagram is enforced, and required attributes are provided.

Five choices are provided when RFC relationship choice validation is required. When the lifecycle state is not protected, an update may be provided if the CI is related to the RFC. When there are protected states, an update may be provided if the CI is related to the RFC and the CI is in or transitioning to/from a protected state. When there are protected states and attributes, an update may be provided when the CI is related to the RFC, the CI is in or transitioning to/from a protected state and required attributes are provided. When there are enforced state transitions, an update may be provided when the CI is related to the RFC and a state diagram is enforced. When there are enforced state transitions and attributes, an update may be provided if the CI is related to the RFC, a state diagram is enforced, and the required attributes are provided.

Five choices are provided when RFC relationship match validation is required. When the lifecycle state is not protected, an update may be provided if the RFC is "the" RFC for this CI update. When there are protected states, an update may be provided when the RFC is "the" RFC for this CI update and the CI is in or transitioning to/from a protected state. When there are protected states and attributes, an update may be provided when the RFC is "the" RFC for this CI update, the CI is in or transitioning to/from a protected state and required attributes are provided. When there are enforced state transitions, an update may be provided when RFC is "the" RFC for this CI update and the state diagram is enforced. When there are enforced state transitions and attributes, an update may be provided when the RFC is "the" RFC for this CI update, the state diagram is enforced, and required attributes are provided.

Figure 4:
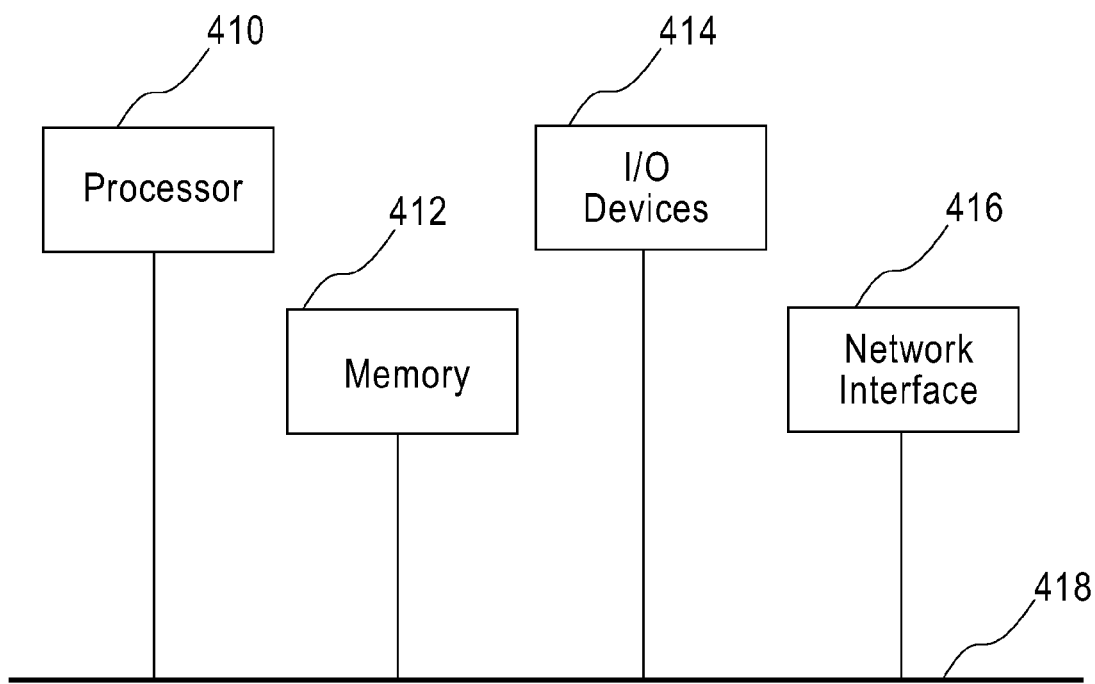
FIG. 4 is a diagram illustrating an illustrative hardware implementation of a computing system in accordance with which one or more components/methodologies of the present invention may be implemented, according to an embodiment of the present invention.

Referring now to FIG. 4, a block diagram illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing a plurality of configuration items in an information repository comprising a processor performing the steps of:

determining whether at least one of a current lifecycle state and a future lifecycle state for each of the configuration items is a protected life cycle state;

determining whether a request for change identifier is provided for the given lifecycle state transition when at least one of the current lifecycle state and the future lifecycle state is a protected lifecycle state for the given configuration item;

permitting a given lifecycle state transition for a given configuration item of the plurality of configuration items when the current lifecycle state and the future lifecycle state for the given configuration item are not protected lifecycle states, or when the request for change identifier is provided for the given lifecycle state transition; and rejecting the given lifecycle state transition when at least one of the current lifecycle state and the future lifecycle state is a protected lifecycle state for the given configuration item and the request for change identifier is not provided for the given lifecycle state transition.

2. The method of claim 1, wherein the information repository comprises a configuration management database.

3. The method of claim 1, wherein a given lifecycle state of the plurality of lifecycle states comprises a protected lifecycle state when changes to the given lifecycle state impact a configuration management database environment.

4. The method of claim 1, wherein the step of determining whether at least one of a current lifecycle state and a future lifecycle state is a protected lifecycle state comprises the steps of:

determining a current lifecycle state for each of the plurality of configuration items; and creating a list of validation requests for lifecycle state transitions of one or more of the plurality of configuration items.

5. The method of claim 1, wherein the step of permitting a given lifecycle state transition comprises the steps of:
   determining whether a future lifecycle state is a valid lifecycle state for the given configuration item;
   rejecting a lifecycle state transition when the future lifecycle state is not a valid lifecycle state for the given configuration item;
   determining whether a lifecycle state transition from a current lifecycle state to the future lifecycle state is valid for the given configuration item in accordance with a lifecycle state transition diagram, when the future lifecycle state is a valid lifecycle state for the given configuration item;
   rejecting the lifecycle state transition when the lifecycle state transition is not valid for the given configuration item; and
   permitting the given lifecycle state transition when the lifecycle state transition is valid for the given configuration item.

6. The method of claim 1, further comprising the step of returning at least one of a success notification and a failure notification of the given lifecycle state transition for the given configuration item.

7. The method of claim 1, further comprising the step of sending at least one of the current lifecycle state, the future lifecycle state, the lifecycle state transition diagram, and the request for change identifier to a user customization module for performance of additional validation activities.

8. The method of claim 7, further comprising the step of utilizing return code from the user customization module to permit lifecycle state transitions.

9. The method of claim 1, further comprising the step of designating protected lifecycle states.

10. The method of claim 1, further comprising the step of updating lifecycle state stored in the information repository as a configuration item attribute.

11. The method of claim 1, wherein the step of determining whether a request for change identifier is provided comprises the step of determining whether an open request for change is related to the configuration item as defined by associations created during construction of a change record.

12. Apparatus for managing a plurality of configuration items in an information repository, comprising:
   a memory; and
   at least one processor coupled to the memory and operative to perform the steps of:
   determining whether at least one of a current lifecycle state and a future lifecycle state for each of the configuration items is a protected life cycle state;
   determining whether a request for change identifier is provided for the given lifecycle state transition when at least one of the current lifecycle state and the future lifecycle state is a protected lifecycle state for the given configuration item;
   permitting a given lifecycle state transition for a given configuration item of the plurality of configuration items when the current lifecycle state and the future lifecycle state for the given configuration item are not protected lifecycle states, or when the request for change identifier is provided for the given lifecycle state transition; and
   rejecting the given lifecycle state transition when at least one of the current lifecycle state and the future lifecycle state is a protected lifecycle state for the given configuration item and the request for change identifier is not provided for the given lifecycle state transition.

13. The apparatus of claim 12, wherein the information repository comprises a configuration management database.

14. The apparatus of claim 12, wherein the step of determining whether at least one of a current lifecycle state and a future lifecycle state is a protected lifecycle state comprises the steps of:
   determining a current lifecycle state for each of the plurality of configuration items; and
   creating a list of validation requests for lifecycle state transitions of one or more of the plurality of configuration items.

15. The apparatus of claim 12, wherein the step of permitting a given lifecycle state transition comprises the steps of:
   determining whether a future lifecycle state is a valid lifecycle state for the given configuration item;
   rejecting a lifecycle state transition when the future lifecycle state is not a valid lifecycle state for the given configuration item;
   determining whether a lifecycle state transition from a current lifecycle state to the future lifecycle state is valid for the given configuration item in accordance with a lifecycle state transition diagram, when the future lifecycle state is a valid lifecycle state for the given configuration item;
   rejecting the lifecycle state transition when the lifecycle state transition is not valid for the given configuration item; and
   permitting the given lifecycle state transition when the lifecycle state transition is valid for the given configuration item.

16. The apparatus of claim 12, further comprising the step of returning at least one of a success notification and a failure notification of the given lifecycle state transition for the given configuration item.

17. The apparatus of claim 12, further comprising the step of sending at least one of the current lifecycle state, the future lifecycle state, the lifecycle state transition diagram, and the request for change identifier to a user customization module for performance of additional validation activities.

18. An article of manufacture for managing a plurality of configuration items in an information repository, comprising a machine readable storage medium containing one or more programs which when executed by a processor implement the steps of:
   determining whether at least one of a current lifecycle state and a future lifecycle state for each of the configuration items is a protected life cycle state;
   determining whether a request for change identifier is provided for the given lifecycle state transition when at least one of the current lifecycle state and the future lifecycle state is a protected lifecycle state for the given configuration item;
   permitting a given lifecycle state transition for a given configuration item of the plurality of configuration items when the current lifecycle state and the future lifecycle state for the given configuration item are not protected lifecycle states, or when the request for change identifier is provided for the given lifecycle state transition; and
   rejecting the given lifecycle state transition when at least one of the current lifecycle state and the future lifecycle state is a protected lifecycle state for the given configuration item and the request for change identifier is not provided for the given lifecycle state transition.

* * * * *